United States Patent Office 3,462,388
Patented Aug. 19, 1969

3,462,388
METHOD OF MAKING FLUORESCENT COMPOUND BONDED-POLYMERS AND POLYMERS MADE THEREBY
Shojiro Horiguchi, 965 Shimohoya, Hoyamachi, Kitatamagun, Tokyo, and Michiei Nakamura, 156 5-chome, Motobutocho, Urawa-shi, Saitama-ken, Japan
No Drawing. Filed Dec. 28, 1965, Ser. No. 517,095
Claims priority, application Japan, Dec. 29, 1964, 39/74,159
Int. Cl. C08f 45/66; C09k 1/02
U.S. Cl. 260—41                     13 Claims

ABSTRACT OF THE DISCLOSURE

Fluorescent compound bonded polymers produced by polymerizing at least one ethylenically unsaturated polymerizable monomer with a diazonium salt of at least one fluorescent compound wherein the fluorescent compound is a primary amino-radical containing derivative of a compound selected from the group consisting of stilbene, distyryl benzene, thiazole, oxazole, triazole, carbazole, imidazole, imidazolone, coumarin, pyridine, benzidine, carbostyril, pyrazoline, naphthalimide, aldazine, anilino-anthracene, oxacynine, pyrimidanthrone, triphenylmethane and polycyclic quinone, and their use for coloring articles are described.

---

This invention relates to a fluorescent compound-bonded-polymer and a process for the production thereof.

Generally, paints, inks and coloring materials for textiles and synthetic resins are made by blending a pigment in dry powder form with solvents, varnishes, and/or plasticizers and the like and then dispersing the pigment in the liquid vehicle by wet grinding. However, the pigment particles tend to aggregate or flocculate several times during the drying process and to consequently form clusters with a resulting large pigment particle size. Accordingly, such large pigment particles are not readily dispersible and lead to a low tinting strength.

In an attempt to overcome the disadvantages presented by the aggregation and flocculation of the pigment particles during the drying process the dispersion of the pigment in the dispersing vehicle has been improved by the addition of a surface active agent to the vehicle. However, such addition while possibly improving the pigment particle dispersion has produced undesirable phenomena such as migration.

In any event, since the pigment is merely dispersed in the vehicle such as in a resin or resin film, properties of the resin such as its abrasion resistance, hardness, etc., tend to be reduced and thereby tend to invite cracking and delamination.

In order to overcome these disadvantages, there has been proposed by the inventor (P.C. 4851) U.S. Patent No. 3,337,288, issued Aug. 22, 1967 and (P.C. 4851A) U.S. Patent No. 3,344,098 issued Sept. 26, 1967, a process for the producing of a colored polymer, more particularly, a chromogen-bonded-polymer, which comprises mixing an addition-polymerizable monomer with a diazonium salt of a pigment, a diazonium salt of a dye or a diazonium salt of an intermediate of a pigment or dye and polymerizing such monomer to form the chromogen-bonded-polymer.

The colored polymers, more particularly the chromogen-bonded-polymers which have been produced in the above-mentioned process is a chemical compound, i.e. the chromogen portion therein is chemically bonded directly to the polymer portion. Consequently, the dispersing properties and tinting strength thereof are particularly good. In addition, their resistance to abrasion and their mechanical and electrical properties are also quite good.

Fluorescent compounds such as fluorescent dyes or pigments have heretofore been employed in order to impart fluorescence to materials. However, they present the disadvantage in that the light resistance of the fluorescence is very weak. This disadvantage results from the fact that, although a fluorescent dye, for example is advantageously used because it is easily soluble in water, the fluorescent colored products colored thereby have no permanence in their fluorescent effect. Thus, for example, when a fluorescent dye is used for dyeing of cloth, it is quite often readily washed away by a water washing. A fluorescent pigment presents the disadvantage that it is readily soluble in most organic solvents and consequently does not require the selection of a particular solvent therefor. It has been known to use the fluorescent products which are obtained from the mixing of fluorescent compounds with urea resins and the like. The particles of these fluorescent products are highly crosslinked thermosetting resins, and thus their dispersibility is not good. Consequently, when these fluorescent products are employed, a highly complex dispersing procedure is necessary which is quite cumbersome and inconvenient.

Since chromogen-bonded-polymers produced by the process mentioned hereinabove have been proven to have such desirable characteristics and advantageous properties when used as coloring materials, it is believed that fluorescent compound-bonded-polymers should have commensurately desirable advantageous properties as coloring materials which impart a fluorescent effect to the articles and materials colored thereby and to not posses any of the disadvantages exhibited by known fluorescent dyes, pigments, and intermediates of the dyes and pigments.

Accordingly, it is an important object of this invention to provide a process for preparing fluorescent compound-bonded-polymers.

It is another object to provide the fluorescent compound-bonded-polymers produced by the process in accordance with the preceding object.

It is a further object to provide a process for coloring articles with the fluorescent compound-bonded-polymers of the invention.

These objects are achieved by providing a process in which a mixture is made of either a diazonium salt of a fluorescent dye, or a diazonium salt of a fluorescent pigment or a diazonium salt of an intermediate of a fluorescent pigment or a fluorescent dye, and one or more species of addition-polymerizable monomers. A polymerization is then carried out to form the fluorescent compound-bonded-polymer.

Since a fluorescent compound-bonded-polymer can be produced by the process which comprises mixing a diazonium salt of a fluorescent compound with one or more species of addition-polymerizable monomers and polymerizing the monomers using the diazonium salt of a fluorescent compound as an initiator for the polymerization of the monomers, the polymer portion of the fluorescent compound-bonded-polymer is chemically bonded to its fluorescent compound portion.

The fluorescent compound-bonded-polymers thus obtained can be molded or spun to obtain molded articles, films, filaments and the like having fluorescence. In addition, fluorescent compound-bonded-polymers can also be used for imparting fluorescent effects to fibers or fabrics, e.g., paper, yarns, woven fabrics, nonwoven fabrics and the like, leather, metal foils, glass, synthetic films, molded articles, soaps and synthetic detergents or cosmetics by printing or coating on them or by mixing the fluorescent compound-bonded-polymers therewith.

According to the process of the invention, since a fluorescent compound can be chemically bonded to the polymer to produce the desirable properties, as mentioned hereinabove, the fluorescent compound-bonded-polymer shows such a dispersibility in ultra fine particle form equal to that of a conventional dye by virtue of the dispersibility of the polymer portion's being bonded to the fluorescent compound portion and, as a result, their handling in their applications is very easy. Furthermore, in the production of fluorescent compound-bonded-polymers according to the process of the invention, fluorescent compound-bonded-polymers which are soluble in some solvents but insoluble or only slightly soluble in other solvents can be obtained by a suitable selection of the type and proportional quantity of addition-polymerizable monomers to be polymerized and thus the suitable selection of the polymer for a particular solvent can be made.

When the polymerization is carried out with addition-polymerizable monomers having reactive radicals, there results a polymer portion which is bonded to a fluorescent compound portion, and which has reactive radicals. Such reactive radicals can be interreacted together or reacted with reactive radicals of a material to which fluorescence is to be imparted. For example, reactive radicals of fabrics are reacted with reactive radicals of reactive compounds such as crosslinking agents, precondensates of thermosetting resins, reactive latex, crosslinkable high molecular compounds, to be strongly fixed on the materials to be rendered fluorescent. Consequently, the fluorescent compound-bonded-polymer can not be washed away and the materials to which fluorescence is imparted have a superior permanence of fluorescent properties.

Polymerization can be carried out, according to the invention, by mixing one or more types of monomers without any regard to the proportional quantity of each type of monomer. The properties of the polymer portion in the fluorescent compound-bonded-polymer are derived from those of the monomers of various types, i.e, reactive functional, weakly-reactive or non-reactive, or water-or oil dispersible, also depending upon the proportional quantity of each type of monomer when mixed. Such polymerization can be carried out by any of the known methods of addition-polymerization such as, solution-, block-, emulsion-, and suspension-polymerizations.

The addition-polymerizable monomers which may be used in the process according to the invention may be largely divided into three groups according to the reactivity of the radicals thereof. Any generally known polmerization initiator may also be employed in the process of the invention without any obstruction thereby.

By the term "fluorescent compounds" as used herein, it is intended to signify fluorescent dyes, fluorescent pigments, and intermediates of fluorescent dyes and pigments.

As the fluorescent compound components of the diazonium salts of the fluorescent compounds which may be used in the process according to the invention, there may be used compounds derived from stilbene, stilbene disulfonic acid, distyryl benzene, thiazole, oxazole, triazole, carbazole, imidazole, coumarin imidozoline, pyridine, benzidine, carbostyril, pyrazoline, naphthalimide, aldazine, anilino anthracene, oxacyanine, pyrimidanthrone, triphenylmethane, polycyclic quinone and the above mentioned fluorescent compounds which may have or may not have a chromophore and/or an auxochrome as their substituent.

In addition, in the process according to the invention, it is very useful to use mixture, of the diazonium salts of the pigments, diazonium salts of the dyes and diazonium salts of their intermediates described in the process of making the chromogen-bonded-polymer, abovementioned, in addition to a diazonium salt of a fluorescent compound.

For example, a product obtained by mixing an addition-polymerizable monomer with a diazonium salt of a fluorescent dye and a copper phthalocyanine blue-4,4',4''-tri'-diazonium salt and then by polymerizing the monomer, has the advantage of producing a very clear bright sky-blue color. When this product is used, for example, as a coloring agent for a cloth, a bright bluish shade and at the same time fluorescence even in a light color shade will be imparted and thus a very useful function provided.

The addition-polymerizable monomers which may be used in the process of the present invention are selected from the group classified as follows:

A first sub-group consisting of a first division consisting of addition-polymerizable monomers which, when polymerized, form polymers containing in their structures-reactive functional radicals which are capable of crosslinking to form a higher polymer and which are capable of crosslinking with a functional radical, and a second division consisting of addition-polymerizable monomers which, when polymerized, form polymers containing in their structures reactive radicals capable of linking with functional radicals but incapable of crosslinking on themselves, and a second sub-group consisting of addition-polymerizable monomers which are difficultly activated with reactive functional radicals.

The addition-polymerizable monomers belonging to the first division of the aforesaid first sub-group are addition-polymerizable monomers containing in their structures reactive functional radicals such as the N-methylol amide, the N-alkyl-methylolamide, the epoxy radical, the chlorohydrin, the ethyleneimine, the acid chloride. and the isocyanate forming radical, and the like.

Examples of addition-polymerizable monomers belonging to the aforesaid first division of the first sub-group are acrylic chloride, methacrylic chloride, crotonic chloride, itaconic chloride, maleic chloride, fumaric chloride, N-methylol acrylamide, N-methylol methacrylamide, N-methylol crotonic amide, N-methylol itaconic monoamide, N,N'-dimethylol itaconic diamide, N-methylol fumaric monoamide, N,N'-dimethylol fumaric diamide, tri- and tetra-methylol diamino vinyl triazine, N-mono-, N-mono-, di-, tri- and tetra-methylol diamino vinyl triazine, N-mono-, di-, and tri-methylol vinyl urea, N-alkylmethylol acrylamide, N-alkylmethylol methacrylamide, N-alkylmethylol crotonic amide, N-alkylmethylol itaconic monoamide, N,N'-dialkylmethylol itaconic diamide, N-alkylmethylol maleic monoamide, N,N'-dialkylmethylol maleic diamide, N-alkylmethylol fumaric monoamide, N, N'-dialkylmethylol fumaric diamide, N-mono-, di-, tri- and tetra-alkylmethylol diamino vinyl triazine, N-mono-, di- and trialkylmethylol vinyl urea, glycidyl acrylate, glycidyl methacrylate, glycidyl crotonate, monoglycidyl itaconate, diglycidyl itaconate, allyl glycidylether, γ-chloro-β-hydroxy-n-propyl acrylate, γ-chloro-β-hydroxy-n-propyl methacrylate, mono - (γ-chloro-β-hydroxy-n-propyl)itaconate, di(γ-chloro-β-hydroxy-n-propyl)itaconate, and allyl γ-chloro-β-hydroxy-n-propyl ether and the like.

The addition-polymerizable monomers belonging to the second division of the first sub-group are addition-polymerizable monomers containing in their structures reactive radicals which are selected from the group consisting of carboxyl, hydroxyl, carboamide, sulfoamide, urea, amino triazine, amino and imino radicals, and the like.

Examples of addition-polymerizable monomers belonging to the second division of the aforesaid first sub-group are acrylic acid, methacrylic acid, crotonic acid, itaconic acid, maleic acid, fumaric acid, acrylamide, methacrylamide, crotonic amide, itaconic monoamide, itaconic diamide, maleic monoamide, maleic diamide, fumaric monoamide, fumaric diamide, diamino vinyl triazine, vinyl urea, 2-hydroxyethyl acrylate, 2-hydroxyethyl methacrylate and the like.

Examples of addition-polymerizable monomers belonging to the second sub-group are methyl acrylate, ethyl acrylate, propyl acrylate, butyl acrylate, amyl acrylate, hexyl acrylate, octyl acrylate, lauryl acrylate, stearyl acrylate, methyl methacrylate, ethyl methacrylate, propyl methacrylate, butyl methacrylate, amyl methacrylate, hexyl methacrylate, octyl methacrylate, lauryl methacrylate, stearyl methacrylate, methyl crotonate, ethyl crotonate, butyl crotonate, dimethyl itaconate, diethyl itaconate, dipropyl itaconate, dibutyl itaconate, diamyl itaconate, dihexyl itaconate, dioctyl itaconate, dilauryl itaconate, dimethyl maleate, diethyl maleate, dipropyl maleate, dibutyl maleate, dimethyl fumarate, diethyl fumarate, dipropyl fumarate, dibutyl fumarate, acrylonitrile, methacrylonitrile, vinyl acetate, vinyl propionate, vinyl chloride, vinylidene chloride, styrene, methyl vinyl ketone, methyl vinyl ether, vinyl pyrrolidone, vinyl pyridine, 2-vinyl-5-methyl pyridine, N,N'-dimethylaminoethyl acrylate, N,N'-diethylaminoethyl acrylate, N,N'-dimethylaminoethyl methacrylate, N,N'-diethylaminoethyl methacrylate, butadiene, isoprene, chloroprene and the like.

The fluorescent compound-bonded-polymers produced with the use of the addition-polymerizable monomers belonging to the above first sub-group can be reacted with compounds which, when reacted with the polymers, provides the functional reactive radicals for the polymers to produce the fluorescent compound-bonded-polymers having the reactive functional radicals in their structures. Such compounds are, for example, formaldehyde, di-, tri- and tetramethylol urea, di-, tri-, tetra-, penta- and hexa-alkylmethylol melamine, epichlorohydrin, dichlorohydrin, ethyleneimine and the like.

The fluorescent compound-bonded-polymers produced with the use of the addition-polymerizable monomers having reactive and/or hydrolyzable radicals in their structures belonging to all of the above, the groups, radicals being selected from the group consisting of N-methylol amide, epoxy, chlorohydrin, ethyleneimine, acid chloride, acid anhydride, isocyanate forming carboxyl, hydroxyl, carboamide, sulfoamide, amino, and imino radicals and nitrile, ester, and carboimide radicals, can be reacted with compounds which, when reacted with the polymers, provide the solubilizable and dispersible radicals for the polymers to produce the fluorescent compound-bonded-polymers having the solubilizable and dispersible radicals in their structure.

Examples of these solubilizable and dispersible radicals are carboxyl, sulfate, sulfo, hydroxyl, ether, carboamide, amino, imino, tertiary amino, and pyridine radicals, aliphatic hydrocarbon radicals having 2 to 18 carbon atoms, aromatic and cyclic hydrocarbon radicals, and the like.

Examples of the last mentioned compounds to be reacted with the fluorescent compound-bonded-polymers are as follows:

Chloroacetic acid, sodium bisulfite, sulfamic acid, ethylene oxide, methanol, ethanol, propanol, glycidol, glycerin, ammonia, methylamine, ethylamine, butylamine, dimethylamine, diethylamine, dibutylamine, ethylenediamine, propylene diamine, hexamethylene diamine, diethylenetriamine, dipropylenetriamine, alkali, acid, stearylamine, butanol, octyl alcohol, stearic acid, palmitic acid, oleic acid, stearyl amide, N-methylol stearylamide, and the like.

In addition, the produced fluorescent compound-bonded-polymers can in turn or simultaneously be reacted with both the compounds which provide reactive functional radicals for the polymers during the reaction and the compounds which provide solubilizable and dispersible radicals for the polymers during the reaction.

The following examples will serve to illustrate the invention. However, it is to be understood that it is not intended to limit the scope of the invention thereto. The word parts appearing in the examples is intended to signify parts by weight.

Example 1

A quantity of 3.7 parts of cyanuric chloride was dissolved in 20 parts of acetone and was added dropwise and suspended in 60 parts of water at 0° C. a quantity of 37 parts of an aqueous solution of 10% diaminostilbene disulfonic acid was further gradually added dropwise over a period of 30 minutes in order to be condensed. The temperature was maintained at 0 to 3° C. The hydrochloric acid produced thereby was neutralized with an aqueous solution of 5% sodium carbonate and the reaction solution was kept weakly acid. After the dropwise additions were completed, the solution was stirred for 1 hour and was then precisely neutralized. Thereafter, 3.5 parts of 3,5-dichloro-1,4-phenylene diamine (having the trade name, "Brown RR Base") were dissolved in 30 parts of acetone and were added dropwise. The hydrochloric acid produced in this step was gradually neutralized with an aqueous solution of 5% sodium carbonate and the reaction temperature was kept at 3 to 12° C. The reaction was continued for about 3 hours. Then, 2.4 parts of monoethanolamine were caused to react at 75° C. for 4 hours. After 2 hours after the temperature had reached 75° C., 21.6 parts of an aqueous solution of 5% sodium carbonate were added dropwise over a 2 hour period and the hydrochloric acid produced thereby was neutralized. Then, 600 parts of water were added, the solution was heated up to 85° C. and was then filtered. The filtrate was cooled to 10° C., was salted out by the adding thereto of 60 parts of sodium chloride, and was filtered. When the cake resulting from the filtration was washed with an aqueous solution of 15% sodium chloride and then dried, 9.2 parts of product having the following structural formula were obtained.

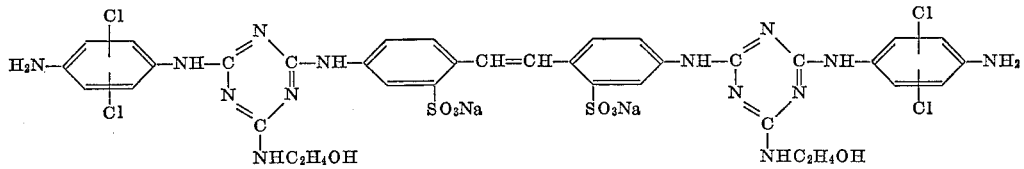

A quantity of 15 parts of an aqueous solution of 35% hydrochloric acid and 100 parts of water were added to the obtained product and the resulting mixture was well deflocculated with stirring. It was then cooled to 0 to 2° C. by further addition thereto of 100 parts of ice. A quantity of 1.3 parts of sodium nitrite was dissolved in 20 parts of water and the latter solution was added dropwise to the above mixture. The resulting mixture was diazotized for 10 minutes.

A quantity of 30 parts of acrylamide was added to the diazotization. When the diazonium salt contained therein had been decomposed with foaming by the heating of the mixture to 50° C., a viscous polymer was obtained after an hour. It was poured into 600 parts of methanol to precipitate it and the precipitate was obtained by filtration. The filter cake was then added to 300 parts of water and the pH of the resulting solution was adjusted to 9 to 9.5 with an aqueous solution of 5% sodium carbonate. With the addition of 40 parts of formalin to the solution and the methylolation of the solution at 60° C. for 30 minutes, an aqeuous solution of a fluorescent compound-bonded-polymer was obtained. When cloth or paper was printed or impregnated with the polymer solution and was then heated, a lasting fluorescence could be provided and, the cloth or paper could also be resin-treated.

Example 2

A quantity of 15 parts of an aqueous solution of 35% hydrochloric acid and 150 parts of ice water were added to 5 parts of a paste of triaminocopper phthalocyanine blue. 1.5 parts of sodium nitrite were dissolved in 20 parts of water and added dropwise to the above mixture at a temperature of 0 to 5° C. When the mixture was thus diazotized for 15 minutes and then filtered, an aqueous solution of diazotized copper phthalocyanine blue was obtained.

A quantity of 20 parts of a solution of the diazonium salt of the fluorescent compound produced in Example 1 was mixed with the above mentioned aqueous solution of diazotized copper phthalocyanine blue. 15 parts of acrylamide and 5 parts of methyl acrylate were added to the mixed solution. The resulting solution was heated to 55° C. and a polymerization was carried out for about 2 hours. The obtained polymer solution was poured into 600 parts of methanol to precipitate the polymer and the precipitate was obtained by filtration. The filter cake was added to 150 parts of water and the pH of the solution was adjusted to 9 to 9.5 with an aqueous solution of sodium carbonate.

When the latter solution was methylolated by the addition thereto of 30 parts of formalin, a clear blue chromogen-bonded-fluorescent compound-bonded-polymer was obtained. This blue chromogen-bonded-fluorescent compound-bonded-polymer solution was diluted to 1% with water and there was added thereto, an aqueous solution of 50% ammonium citrate as a curing catalyst in a ratio of 1.2 parts of 50% amomnium citrate solution to 100 parts of the diluted solution. It was dried in open air, and then cured at 140° C. for 5 minutes. A fluorescent bright blue plain dyed cloth could be obtained.

Example 3

A chromogen-bonded-fluorescent compound-bonded-polymer could be obtained by using a diazonium salt of an azo pigment having the following structural formula instead of using the aqueous solution of diazotized copper phthalocyanine blue according to the method described in Example 2. When a cotton cloth was dipped and dyed in the solution in the manner as described in Example 2, a fluorescent clear red or yellow dip-dyed cloth was obtained.

1.

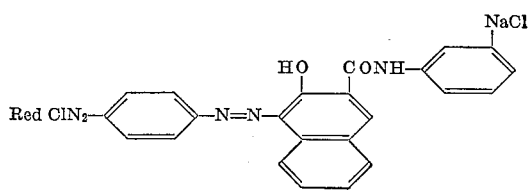

2.

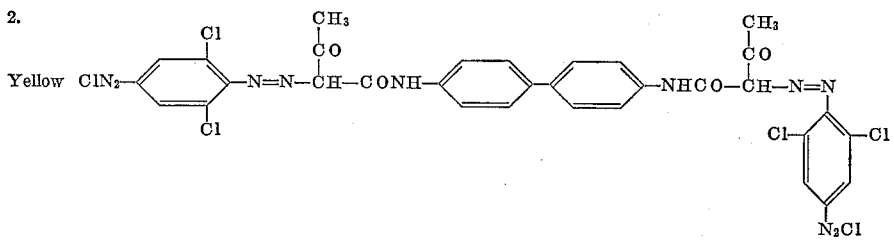

Example 4

A quantity of 10 parts of the product obtained in Example 1 and having the following structural formula was dispersed in 90 parts of acetone.

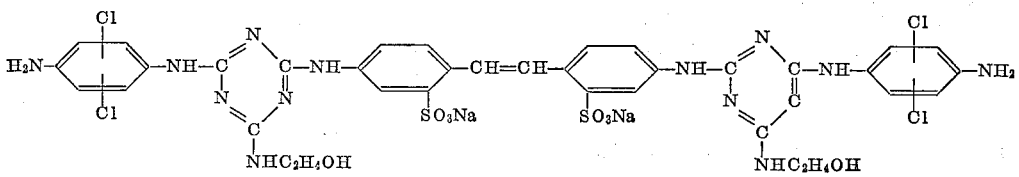

1.5 parts of pyridine were added to the dispersion. 1.7 parts of diketene were then added dropwise thereto at 20° C. over a period of 2 hours. The mixture was reacted for 2 hours by elevating the temperature to 40° C. By using the obtained compound as a coupling component, 3,5-dichloro-1-aminophenylene-4-diazonium salt was coupled with it to obtain a compound having the following structural formula

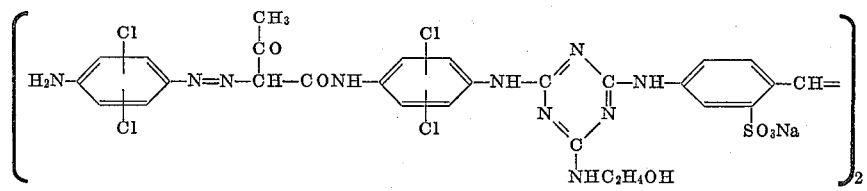

When this compound diazotized and polymerized by the same method as that described in Example 3, a chomogen-bonded-fluorescent compound-bonded-polymer was obtained.

Example 5

A quantity of 100 parts of an aqueous mixture containing 0.7 part of a diazonium salt of a fluorescent pigment having the following structural formula

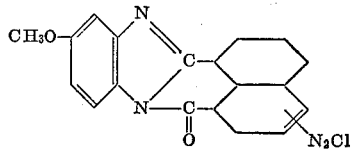

6 parts of acrylamide, 1 part of methyl acrylate, 0.5 part of glycidyl methacrylate and 0.1 part of polyethyleneglycol alkyl ether was charged in a polymerization vessel. The polymerization was carried out at 50° C. for 2 hours and then at 65° C. for 2 hours.

After polymerization, 600 parts of methanol were added to precipitate the fluorescent compound-bonded-polymer. The precipitate was filtered, washed with methanol and dried in open air.

Example 6

A quantity of 100 parts of an aqueous mixture containing 0.7 part of a diazonium salt of a fluorescent dye having the following structural formula

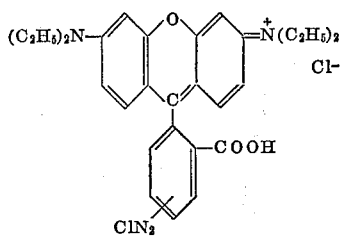

6 parts of methacrylamide, 1 part of methacrylic acid, 0.5 part of glycidyl methacrylate and 0.1 part of polyethyleneglycol alkyl ether was charged in a polymerization vessel. A polymerization was then carried out according to the method described in Example 5.

After polymerization, 500 parts of methanol were added to precipitate the fluorescent compound-bonded-polymer. The precipitate was obtained by filtration, washed with methanol and dried in open air.

Example 7

A quantity of 100 parts of an aqueous mixture containing 0.7 part of a diazonium salt of a fluorescent pigment having the following structural formula

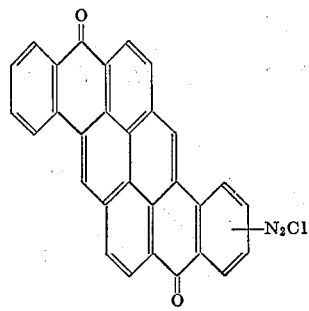

5 parts of acrylamide, 1.2 parts of acrylic acid and 1 part of γ-chloro-β-hydroxy-n-propyl acrylate was charged in a polymerization vessel. A polymerization was then carried out according to the method described in Example 5.

After the polymerization, 500 parts of methanol were added to precipitate the fluorescent compound-bonded-polymer. The precipitate was filtered and washed with methanol.

Example 8

A quantity of 100 parts of an aqueous mixture containing 0.7 part of a diazonium salt of a fluorescent pigment having the following structural formula

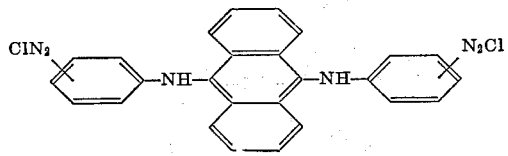

7 parts of glycidyl methacrylate, and 1 part of polyethyleneglycol alkyl ether were charged in a polymerization vessel. A polymerization was carried out according to the method described in Example 5.

After polymerization, 300 parts of methanol were added to precipitate the fluorescent compound-bonded-polymer. The precipitate was filtered, washed with water and methanol and dried in open air.

Example 9

A quantity of 100 parts of an aqueous mixture containing 0.7 part of a diazonium salt of a fluorescent pigment having the following structural formula

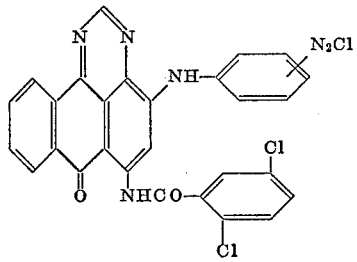

7 parts of methyl methacrylate, 1 part of glycidyl methacrylate and 0.5 part of polyethyleneglycol alkyl ether was charged in a polymerization vessel. A polymerization was carried out at 50° C. for 1 hour and then at 65° C. for 3 hours.

After the polymerization, 400 parts of methanol were added to precipitate the fluorescent compound-bonded polymer. The precipitate was filtered, washed with methanol and dried in open air.

Example 10

A quantity of 100 parts of an aqueous mixture containing 0.7 part of a diazonium salt of a fluorescent pigment having the following structural formula

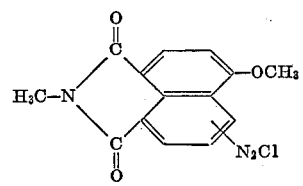

5 parts of methyl methacrylate, 2 parts of ethyl acrylate, 1 part of glycidyl acrylate and 0.4 part of polyethyleneglycol alkyl ether was charged in a polymerization vessel. A polymerization was then carried out according to the method described in Example 5.

After the polymerization, 300 parts of methanol were added to precipitate the fluorescent compound-bonded-polymer. The precipitate was filtered, washed with water and methanol and dried in open air.

Example 11

A quantity of 100 parts of an aqueous mixture containing 0.7 part of a diazonium salt of a fluorescent pigment having the following structural formula

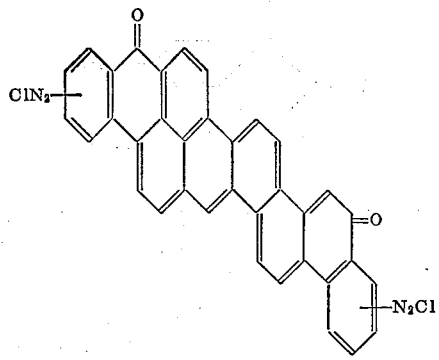

6 parts of butyl acrylate, 1 part of acrylonitrile and 0.5 part of 4,6-bis(N-butylmethylolamino)-2-vinyl-s-triazine was charged in a polymerization vessel. A polymerization was then carried out according to the method described in Example 5.

After polymerization, the precipitated fluorescent compound-bonded-polymer was filtered and washed with water and methanol.

Example 12

A quantity of 100 parts of an aqueous mixture containing 0.7 part of a diazonium salt of a fluorescent dye having the following structural formula

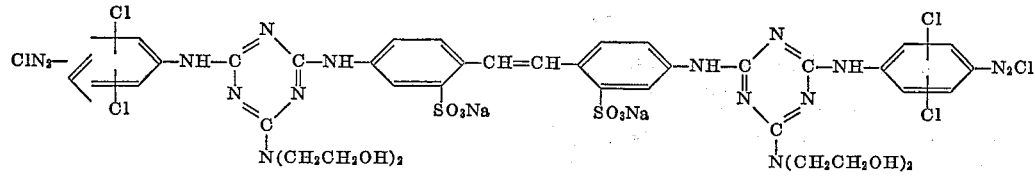

and 7 parts of acrylic acid were charged in a polymerization vessel. A polymerization was carried out according to the method described in Example 1.

After the polymerization, the pH was adjusted to 9 and 500 parts of acetone were added to precipitate the fluorescent compound-bonded-polymer. The precipitate was filtered, washed with acetone and dried in open air.

Example 13

A quantity of 100 parts of an aqueous mixture containing 0.7 part of a diazonium salt of a fluorescent pigment having the following structural formula

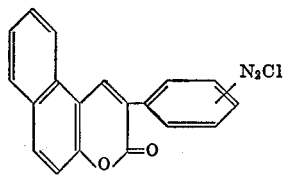

5 parts of acrylamide and 2 parts of itaconic amide was charged in a polymerization vessel. A polymerization was carried out according to the method described in Example 5.

After the polymerization, the obtained solution was filtered and resulting filtrate was poured into 600 parts of acetone to precipitate the fluorescent compound-bonded-polymer. The precipitate was obtained by filtration, washed with acetone and dried in open air.

Example 14

A quantity of 100 parts of an aqueous mixture containing 0.7 part of a diazonium salt of a fluorescent pigment having the following structural formula

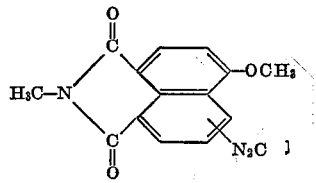

5 parts of methacrylic acid and 2 parts of ethyleneglycol monoacrylate were charged in a polymerization vessel. A polymerization was carried out according to the method described in Example 1.

After polymerization, the pH was adjusted to 9 to obtain the solution of the fluorescent compound-bonded-polymer which was filtered.

Example 15

A quantity of 100 parts of an aqueous mixture containing 0.7 part of a diazonium salt of fluorescent pigment having the following structural formula

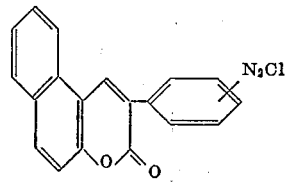

3 parts of acrylic acid and 2 parts of methyl acrylate were charged in a polymerization vessel. A polymerization was carried out according to the method described in Example 1.

After polymerization, the pH was adjusted to 9 and 600 parts of acetone were added to precipitate the fluorescent compound-bonded-polymer. The precipitate was obtained by filtration, washed with acetone and dried in open air.

Example 16

A quantity of 100 parts of an aqueous mixture containing 0.7 part of a diazonium salt of a fluorescent pigment having the following structural formula

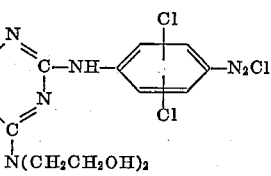

4 parts of N,N-dimethylaminoethyl methacrylate and 3 parts of methyl acrylate was charged in a polymerization vessel. A polymerization was carried out according to the method described in Example 1.

After polymerization, the pH was adjusted to 10 to precipitate the fluorescent compound-bonded-polymer. The precipitate was obtained by filtration and washed with a dilute solution of sodium carbonate.

Example 17

A quantity of 100 parts of an aqueous mixture containing 0.7 part of a diazonium salt of a fluorescent pigment having the following structural formula

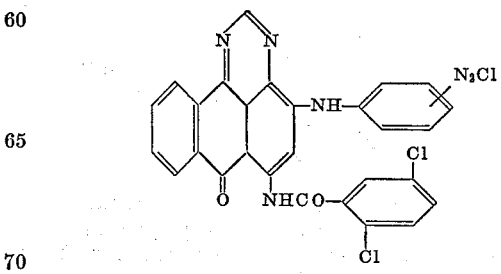

10 parts of methyl methacrylate and 0.5 part of triethanolamine alkylbenzene sulfonate was charged in a polymerization vessel. A polymerization was carried out according to the method described in Example 5.

After polymerization, 200 parts of methanol were added to precipitate the fluorescent compound-bonded-polymer. The precipitate was obtained by filtration, washed with water and methanol, and dried in open air.

Example 18

A quantity of 100 parts of an aqueous mixture containing 0.7 part of a diazonium salt of a fluorescent pigment having the following structural formula

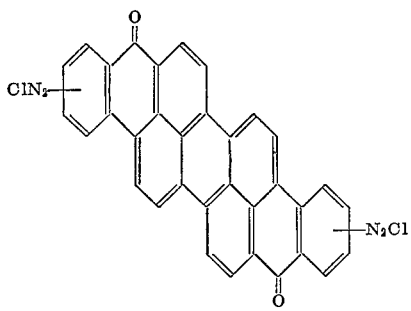

8 parts of ethyl acrylate and 1 part of acrylonitrile was charged in a polymerization vessel. A polymerization was then carried out according to the method described in Example 5.

After polymerization, the precipitated fluorescent compound-bonded-polymer which was obtained by filtration was washed with methanol and dried in open air.

Example 19

A quantity of 100 parts of an aqueous mixture containing 0.7 part of a following diazonium salt of fluorescent pigment having the following structural formula

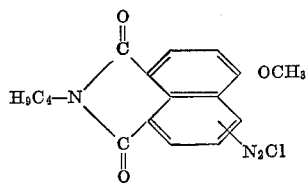

7 parts of acrylonitrile, 3 parts of ethyl acrylate and 1 part of triethanolamine alkylbenzene sulfonate was charged in a polymerization vessel. A polymerization was then carried out according to the method described in Example 5.

After polymerization, 300 parts of methanol were added to precipitate the fluorescent compound-bonded-polymer. The precipitate was obtained by filtration, washed with water and methanol and dried in open air.

Example 20

A quantity of 5 parts of the methylolated fluorescent compound-bonded-polymer prepared according to the method described in Example 1 was dissolved in 95 parts of water. Then, 50 parts of a 10% aqueous solution of sodium bisulfite were added to the above solution and pH of the solution was adjusted to 10 with a 5% aqueous solution of sodium carbonate.

A sulfonation reaction was then carried out at 60° C. for 3 hours. After filtration, 2 parts of sodium chloride and 500 parts of methanol were added to the filtrate to precipitate the fluorescent compound-bonded-polymer. The precipitate was obtained by filtration, washed with 10 parts of acetone and dried in open air.

Example 21

A quantity of 5 parts of the fluorescent compound-bonded-polymer prepared according to the method described in Example 8 was dissolved in 95 parts of ethyleneglycol monoethylether monoacetate. Then, 13 parts of a 20% ethyleneglycol monoethylether monoacetate solution of diethylamine were added dropwise to the above solution at 50° C. over a period of an hour.

After stirring the resulting solution for 2 hours at 65° C., the solution was cooled to 15° C., and poured into 5,000 parts of a 0.5% aqueous solution of sodium hydroxide to precipitate the fluorescent compound-bonded-polymer. The precipitate was obtained by filtration, washed with 20 parts of water, and then dried in open air.

Example 22

A quantity of 5 parts of the fluorescent compound-bonded-polymer prepared according to the method described in Example 18 was dissolved in 95 parts of benzene. Then, 80 parts of a 5% ethanol solution of potassium hydroxide were added to the above solution.

A hydrolysis reaction was then carried out at 75° C. over a period of 12 hours. After such reaction, the precipitated fluorescent compound-bonded-polymer was obtained by filtration, washed with 50 parts of ethanol, and dried in open air.

While there have been described what are considered to be the preferred embodiments of this invention, it will be obvious to those skilled in the art that other modifications and changes may be made therein without departing from the invention and it is, therefore, intended in the appended claims to cover all such changes as fall within the spirit and scope of the invention.

What is claimed is:

1. A method of making a fluorescent compound-bonded-polymer which comprises mixing at least one species of an ethylenically unsaturated polymerizable monomer with a diazonium salt of at least one fluorescent compound wherein the fluorescent compound is a primary amino-radical-containing derivative of a compound selected from the group consisting of stilbene, distyryl benzene, thiazole, oxazole, triazole, carbazole, imidazole, imidazolone, coumarin, pyridine, benzidine, carbostyril, pyrazoline, naphthalimide, aldazine, anilino-anthracene, oxacyanine, pyrimidanthrone, triphenylmethane and polycyclic quinone and polymerizing said monomer using said diazonium salt of said fluorescent compound as an initiator for the polymerization of said monomer to form said fluorescent compound-bonded-polymer.

2. A method as defined in claim 1 wherein said ethylenically unsaturated polymerizable monomer is selected from the group consisting of a first sub-group consisting of a first division consisting of ethylenically unsaturated polymerizable monomers containing in its structure reactive functional radicals selected from the group consisting of N-methylolamide, N-alkylmethylol amide, epoxy, chlorohydrin, ethyleneimine, acid chloride and isocyanate-forming radicals, all of said first division monomers being capable of cross-linking to form a higher polymer and capable of cross-linking with a functional radical of a material, and a second division consisting of an ethylenically unsaturated polymerizable monomer containing in its structure reactive radicals selected from the group consisting of carboxyl, hydroxyl, carboamide, sulfoamide, urea, aminotriazine, amino and imino radicals, all of said second division monomers being capable of linking with a functional radical but incapable of cross-linking with themselves under ordinary curing conditions, and a second sub-group consisting of an ethylenically unsaturated polymerizable monomer containing in its structure non-reactive radicals selected from the group consisting of an alkyl ester, aryl ester, alkyl, alicyclic, aryl, chloride, alkylcarbonyl, alkyl ether, N,N-dialkylamide, N-alkylimide, tertiaryamino, nitrile, sulfo and pyridine radicals all said second sub-group monomers being difficulty activated with reactive functional radicals.

3. A method as defined in claim 2 wherein said first division of said first sub-group consists of acrylic chloride, methacrylic chloride, crotonic chloride, itaconic chloride, maleic chloride, fumaric chloride, N-methylol acrylamide, N-methylol methacrylamide, N-methylolcrotonic amide, N-methylol itaconic monoamide, N,N'-dimethylol itaconic diamide, N-methylol maleic monoamide, N,N'-dimethylol maleic diamide, N-methylol fumaric monoamide, N,N'-dimethylol fumaric diamide, N-mono-, di-, tri- and tetramethylol diamino vinyl triazine, N-amino-, di-, and trimethylol vinyl urea, N-alkylmethylol acrylamide, N-alkylmethylol methacrylamide, N-alkylmethylol crotonic amide, N-alkylmethylol itaconic monoamide, N,N'-dialkylmethylol itaconic diamide, N-alkylmethylol maleic monoamide, N,N'-dialkylmethylol maleic diamide, N-alkylmethylol fumaric monoamide, N,N'-dialkylmethylol fumaric diamide, N-mono-, di-, tri- and tetra-alkylmethylol diamino vinyl triazine, N-mono-, di- and tri-alkylmethylol vinyl urea, glycidyl acrylate, glycidyl methacrylate, glycidyl crotonate, monoglycidyl itaconate, diglycidyl itaconate, allyl glycidyl ether, γ-chloro-β-hydroxy-n-propyl acrylate, γ-chloro-β-hydroxy-n-propyl methacrylate, mono-(γ-chloro-β-hydroxy-n-propyl) itaconate, di-(γ-chloro-β-hydroxy-n-propyl) itaconate and allyl γ-chloro-β-hydroxy-n-propyl ether.

4. A method as defined in claim 2 wherein said second division of said first sub-group consists of acrylic acid, methacrylic acid, crotonic acid, itaconic monoacid monoester, itaconic acid, maleic monoacid monoester, maleic acid, fumaric monoacid monoester, fumaric acid, acrylamide, methacrylamide, crotonic amide, itaconic monoamide, itaconic diamide, maleic monoamide, maleic diamide, fumaric monoamide, fumaric diamide, diaminovinyltriazine, vinylurea, 2-hydroxyethyl acrylate and 2-hydroxyethyl methacrylate.

5. A method as defined in claim 2 wherein said second sub-group consists of methyl acrylate, ethyl acrylate, propyl acrylate, butyl acrylate, amyl acrylate, hexylacrylate, octyl acrylate, lauryl acrylate, stearyl acrylate, methyl methacrylate, ethyl methacrylate, propyl methacrylate, butyl methacrylate, amyl methacrylate, hexyl methacrylate, octyl methacrylate, lauryl methacrylate, stearyl methacrylate, methyl crotonate, ethyl crotonate, butyl crotonate, methyl itaconate, ethyl itaconate, propyl itaconate, butyl itaconate, amyl itaconate, hexyl itaconate, octyl itaconate, lauryl itaconate, methyl maleate, ethyl maleate, propyl maleate, butyl maleate, methyl fumarate, ethyl fumarate, propyl fumarate, butyl fumarate, acrylonitrile, methacrylonitrile, vinyl acetate, vinyl propionate, vinyl chloride, vinylidene chloride, styrene, methyl vinyl ketone, methyl vinyl ether, vinyl pyrrolidone, vinyl pyridine, 2-vinyl-5-methyl pyridine, N,N-diethylaminoethyl acrylate, N,N-dimethylaminoethyl methacrylate, N,N-diethylaminoethyl methacrylate, butadiene, isoprene and chloroprene.

6. A method as defined in claim 1 and further including the step of reacting the fluorescent compound-bonded-polymer with a compound which, when reacted with said polymer, provides reactive functional radicals selected from the group consisting of the N-methylolamide, N-alkylmethylolamide, epoxy, chlorohydrin, ethyleneimine, acid chloride and isocyanate-forming radicals for said polymer to produce the fluorescent compound-bonded-polymer having said reactive functional radicals in its structure.

7. A method as defined in claim 6 wherein said compound which, when reacted with said fluorescent compound-bonded-polymer provides it with reactive functional radicals, is a compound selected from the group consisting of formaldehyde, di-, tri- and tetra-methylol urea, di-, tri-, tetra-, penta- and hexa-methylol melamine, di-, tri-, tetra-, penta- and hexa-alkylmethylol melamine, epichlorohydrin, dichlorohydrin and ethyleneimine.

8. A method as defined in claim 1 and further including the step of reacting the fluorescent compound-bonded-polymer with a material which, when reacted with said polymer, provides solubilizable and dispersible radicals selected from the group consisting of carboxyl, sulfate, sulfo, hydroxyl, ether, carboamide, amino, imino, tertiary amino, and pyridine radicals, aliphatic hydrocarbon radicals having 2 to 18 carbon atoms, and aromatic and cyclic hydrocarbon radical for said polymer to produce said fluorescent compound-bonded-polymer having said solubilizable and dispersible radicals in its structure.

9. A method as defined in claim 8 wherein said material which, when reacted with said fluorescent compound-bonded-polymer, provides it with the radicals capable of rendering said polymer solubilizable and dispersible, is a compound selected from the group consisting of chloroacetic acid, sodium bisulfite, sulfamic acid, ethylene oxide, methanol, ethanol, propanol, glycidol, glycerin, ammonia, methyl amine, ethyl amine, butyl amine, dimethyl amine, diethylamine, dibutyl amine, ethylenediamine, propylene diamine, hexamethylene diamine, diethylene triamine, dipropylene triamine, alkali, acid, stearyl amine, butanol, octyl alcohol, stearic acid, palmitic acid, oleic acid, stearyl amide and N-methylol stearyl amide.

10. A method as defined in claim 1 and further including the step of reacting the fluorescent compound-bonded-polymer with a compound which, when reacted with said polymer, provides it with reactive functional radicals selected from the group consisting of the N-methylolamide, N-alkylmethyloalamide, epoxy, chlorohydrin, ethyleneimine, acid chloride and isocyanate-forming radicals for said polymer to produce said fluorescent compound-bonded-polymer having reactive functional radicals in its structure and reacting said last-named polymer with a material which, when reacted with said last-named polymer, provide for said polymer structure, radicals selected from the group consisting of carboxy, sulfate, sulfo, hydroxyl, ether, carboamide, amino, imino, tertiary amino, and pyridine radicals, aliphatic hydrocarbon radicals having 2 to 18 carbon atoms, and aromatic and cyclic hydrocarbon radicals said last named radicals being capable of rendering said polymer solubilizable and dispersible to produce said fluorescent compound-bonded-polymer having reactive functional radicals and solubilizable and dispersible radicals in its structure.

11. A method as defined in claim 10 wherein said compound which, when reacted with said fluorescent compound-bonded-polymer, provides it with reactive functional radicals, is a compound selected from the group consisting of formaldehyde, di-, tri- and tetra-methylol urea, di-, tri-, tetra-, penta- and hexa-methylol melamine, di-, tri-, tetra-, penta- and hexaalkylmethylol melamine, epichlorohydrin, dichlorohydrin and ethyleneimine, and said material which, when reacted with said fluorescent compound-bonded-polymer, provides it with the radicals capable of rendering said polymer solubilizable and dispersible, is a compound selected from the group consisting of chloroacetic acid, sodium bisulfite, sulfamic acid, ethylene oxide, methanol, ethanol, propanol, glycidol, glycerin, ammonia, methyl amine, ethyl amine, butyl amine, dimethyl amine, diethyl amine, dibutyl amine, ethylenediamine, propylene diamine, hexamethylene diamine, diethylene triamine, dipropylene triamine, alkali, acid, stearyl amine, butanol, octyl alcohol, stearic acid, palmitic acid, oleic acid, stearyl amide and N-methylol stearyl amide.

12. The fluorescent compound-bonded-polymer produced by the method of claim 1.

13. A method of imparting to fibers, fabrics, paper, yarns, woven fabrics, non woven fabrics, leather, metal foils, glass, synthetic films, molded articles, soaps, synthetic detergents and cosmetics, a fluorescent effect with a fluorescent agent comprising utilizing as said fluorescent agent the fluorescent compound-bonded-polymer defined in claim 12.

References Cited

UNITED STATES PATENTS 2,274,551  2/1942  Kenyon et al. _____ 262—152
2,498,593  2/1950  Switzer et al. _____ 252—301.2
2,837,520  6/1958  Fusco et al. _____ 260—249.5

FOREIGN PATENTS 965,627  8/1964  Great Britain.

MORRIS LIEBMAN, Primary Examiner

H. H. FLETCHER, Assistant Examiner

U.S. Cl. X.R.

252—301.2; 260—141, 144, 153, 874, 881, 883, 885